US008117135B2

(12) United States Patent
Hong et al.

(10) Patent No.: US 8,117,135 B2
(45) Date of Patent: Feb. 14, 2012

(54) CONCERNED INFORMATION RECOMMENDATION SYSTEM AND METHOD CONSIDERING USER'S WATCHING OR LISTENING TIME AND MAXIMUM PLAYING TIME OF CONTENTS

(75) Inventors: Kwang-Seok Hong, Gwacheon-si (KR); Hyeong-Joon Kwon, Seongnam-si (KR)

(73) Assignee: Sungkyunkwan University Foundation for Corporate Collaboration, Cheoncheon-Dong, Jangan-Gu, Gyeonggi-Do, Suwon-Si (KR)

( * ) Notice: Subject to any disclaimer, the term of this patent is extended or adjusted under 35 U.S.C. 154(b) by 680 days.

(21) Appl. No.: 12/325,422

(22) Filed: Dec. 1, 2008

(65) Prior Publication Data

US 2009/0299943 A1  Dec. 3, 2009

(30) Foreign Application Priority Data

May 30, 2008  (KR) .................. 10-2008-0050947

(51) Int. Cl.
*G06F 15/18* (2006.01)
*G06G 7/00* (2006.01)
(52) U.S. Cl. .......................................................... 706/5
(58) Field of Classification Search .................... None
See application file for complete search history.

(56) References Cited

U.S. PATENT DOCUMENTS 7,979,390 B2 * 7/2011 Chellappa et al. ............ 707/618
2006/0179154 A1 * 8/2006 Sitaraman et al. ............ 709/231

FOREIGN PATENT DOCUMENTS

KR  2002-0066645  8/2002
KR  2007-0079598  8/2007

* cited by examiner

*Primary Examiner* — Jeffrey A Gaffin
*Assistant Examiner* — Li-Wu Chang
(74) *Attorney, Agent, or Firm* — Lexyoume IP Group, PLLC

(57) ABSTRACT

A user-concerned information recommendation system and method considering user's watching or listening time and the maximum playing time of contents are disclosed. The user-concerned information provision system includes a plurality of user terminals to provide contents transmitted from an external server to a user, a user-concerned information inference server to infer an association relationship between the contents based on information of maximum playing time and actual playing time of the contents provided to the user terminals, and a content provision server to provide a content requested by an arbitrary one of the user terminals and other contents associated with the requested content according to the inferred association relationship to the arbitrary one of the user terminals when receiving a request of the content from the arbitrary one of the user terminals, thereby providing more accurate user-concerned information to the user.

21 Claims, 13 Drawing Sheets

MEMBERSHIP FUNCTION OF CONTENT1

MEMBERSHIP FUNCTION OF CONTENT2

MEMBERSHIP FUNCTION OF CONTENT3

MEMBERSHIP FUNCTION OF CONTENT4

MEMBERSHIP FUNCTION OF CONTENT5

CONCERNED INFORMATION RECOMMENDATION SYSTEM AND METHOD CONSIDERING USER'S WATCHING OR LISTENING TIME AND MAXIMUM PLAYING TIME OF CONTENTS

BACKGROUND OF THE INVENTION

1. Field of the Invention

The present invention relates to a concerned information recommendation system and method considering user's watching or listening time and the maximum playing time of contents.

2. Description of the Related Art

In an information system, personalization means provision of information or contents suitable for an individual user based on information that the user provides to the system. Information that a user can provide to the system may be generally classified into two kinds of information. First is individual user's personal information, such as concerned fields, age, sex, etc., which an individual user can directly input into the system. An example of personalization using sex, one of the personal information, is to recommend currently popular women's wear to a female user when she accesses an electronic commercial transaction system for clothing sale and to recommend currently popular men's wear to a male user when he accesses the electronic commercial transaction system.

Second is information that can be obtained by data-mining the behaviors of an individual user in the electronic commercial transaction system, e.g., an article purchasing pattern of the user in the electronic commercial transaction system and characteristics commonly included in information requested by the user. As an exemplary example, on the assumption that a result that a user having purchased article A has frequently purchased article B and article C simultaneously with the purchasing of article A is obtained through data mining, it is possible to recommend article B and article C to a customer having an intention to purchase article A in the future, thereby achieving the increase in sales.

In an information provision system having no article transaction between a user and the system, however, it is necessary to modify the electronic transaction system and method that are capable of understanding a relationship among article A, article B, and article C, described above as an example.

When a user having requested information A in the past frequently has requested information B and information C simultaneously with the request of information A, it is possible to recommend information B and information C to a user requesting information A in the future. However, when it is not confirmed how much the recommendation has been helpful to the user, it is not possible to guarantee the user's satisfaction degree of the recommended information. For example, news information may be possibly requested by a user due to its sensational title. In this case, however, there is no doubt that the user will request another piece of information without full confirmation of the requested information.

A conventional association rule inquiry method involves a possibility of deriving a wrong association rule for a reason that the concern degree of a user cannot be considered. Even an association rule discovered by an association rule inquiry method known to have a high reliability may not actually be confirmed to be information that the user has been concerned about.

SUMMARY OF THE INVENTION

Therefore, the present invention has been made in view of the above problems, and it is an object of the present invention to provide a system and method that are capable of providing information to a user through playable contents, and, particularly, a concerned information provision system and method that are capable of inquiring an association rule based on information of time for which the user has played the contents.

In accordance with an aspect of the present invention, the above and other objects can be accomplished by the provision of a user-concerned information provision system including a plurality of user terminals to provide contents transmitted from an external server to a user, a user-concerned information inference server to infer an association relationship between the contents based on information of maximum playing time and actual playing time of the contents provided to the user terminals, and a content provision server to provide a content requested by an arbitrary one of the user terminals and other contents associated with the requested content according to the inferred association relationship to the arbitrary one of the user terminals when receiving a request of the content from the arbitrary one of the user terminals.

The user-concerned information inference server may apply the maximum playing time and the actual playing time of the contents to a fuzzy association rule inquiry algorithm to infer the association relationship between the contents.

The user-concerned information inference server may include a database to store information of maximum playing time of stored contents and actual playing time of the contents provided for each session.

The user-concerned information inference server may apply the information of the maximum playing time and the actual playing time of the contents to a membership function to find a transaction, calculate a support degree according to a transaction for each content using the found transaction, extract a candidate content pair having a support degree equal to or greater than a predetermined reference value to calculate an association degree between the candidate contents, and, when the association degree is equal to or greater than a predetermined reference association degree, determine the candidate content pair to be interoperable contents.

The support degree the association degree between the candidate contents may be calculated using mathematical expressions below.

$$supp(\text{item}) = \frac{\sum_i \mu_{item}(t_i)}{D}$$

$$conf(\text{item1} \rightarrow \text{item2}) = \frac{supp(\text{item1, item2})}{supp(\text{item1})}$$

$$supp(\text{item}_1, \text{item}_2) = \frac{\sum_i \min(\mu_{item1}(t_i), \mu_{item2}(t_i))}{D}$$

Also, the membership function may be a function between the actual playing time of the contents and the transaction. The transaction may be classified into a short transaction meaning how short the contents have been played and a long transaction meaning how long the contents have been played.

In accordance with another aspect of the present invention, there is provided a user-concerned information provision method including providing a plurality of requested contents to user terminals and measuring time for which the respective contents have been actually played by the user terminals, inferring an association relationship between the contents using maximum playing time and the actual playing time of the contents provided to the user terminals, and providing a content requested to be played by an arbitrary one of the user terminals and other contents associated with the requested content according to the inferred association relationship to the arbitrary one of the user terminals when receiving a request to play the content from the arbitrary one of the user terminals.

In this case, the step of inferring the association relationship between the contents may include applying the maximum playing time and the actual playing time of the contents to a fuzzy association rule inquiry algorithm to infer the association relationship between the contents.

Also, the step of inferring the association relationship between the contents may include storing actual playing time of the contents provided for each session, applying the maximum playing time and the actual playing time of the contents to a membership function to operate a transaction, calculating a support degree according to a transaction for each content and deciding a candidate content pair having a support degree equal to or greater than a predetermined reference value, and calculating an association degree between the candidate contents of the candidate content pair and, when the association degree is equal to or greater than a predetermined reference association degree, determining the candidate content pair to be interoperable contents.

In accordance with another aspect of the present invention, there is provided a content provision server including a playing time measurement unit to measure time for which a plurality of contents provided to user terminals have been actually played, a database to store maximum playing time and the actual playing time of the contents, an association rule extraction unit to extract an association relationship between the contents, and a content control unit to provide information of a content requested by an arbitrary one of the user terminals and other contents associated with the requested content according to the inferred association relationship to the arbitrary one of the user terminals when receiving a request of the content from the arbitrary one of the user terminals.

The association rule extraction unit may apply the actual playing time of the contents to a fuzzy association rule inquiry algorithm to infer the association relationship between the contents. Also, the association rule extraction unit may apply the information of the maximum playing time and the actual playing time of the contents to a membership function to find a transaction, calculate a support degree according to a transaction for each content using the found transaction, extract a candidate content pair having a support degree equal to or greater than a predetermined reference value to calculate an association degree between the candidate contents, and, when the association degree is equal to or greater than a predetermined reference association degree, determine the candidate content pair to be interoperable contents.

In accordance with a further aspect of the present invention, there is provided a user-concerned information inference method including storing maximum playing time of a plurality of contents and actual playing time of the contents in a database, calculating an association degree between the contents using the maximum playing time and the actual playing time of the contents stored in the database, and inferring concerned information of a user having selected an arbitrary one of the contents using the calculated association degree.

The step of calculating the association degree between the contents may include applying the maximum playing time and the actual playing time of the contents to a membership function to operate a transaction value, calculating a support degree to play the contents using the operated transaction value, and extracting a candidate content pair, which can be associated with each other, having a support degree equal to or greater than a predetermined reference value and calculating an association degree between the candidate contents using the transaction value of the candidate contents.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a user-concerned information provision system and method considering playing time of contents according to the present invention will be described in detail with reference to the accompanying drawings.

Figure 1:
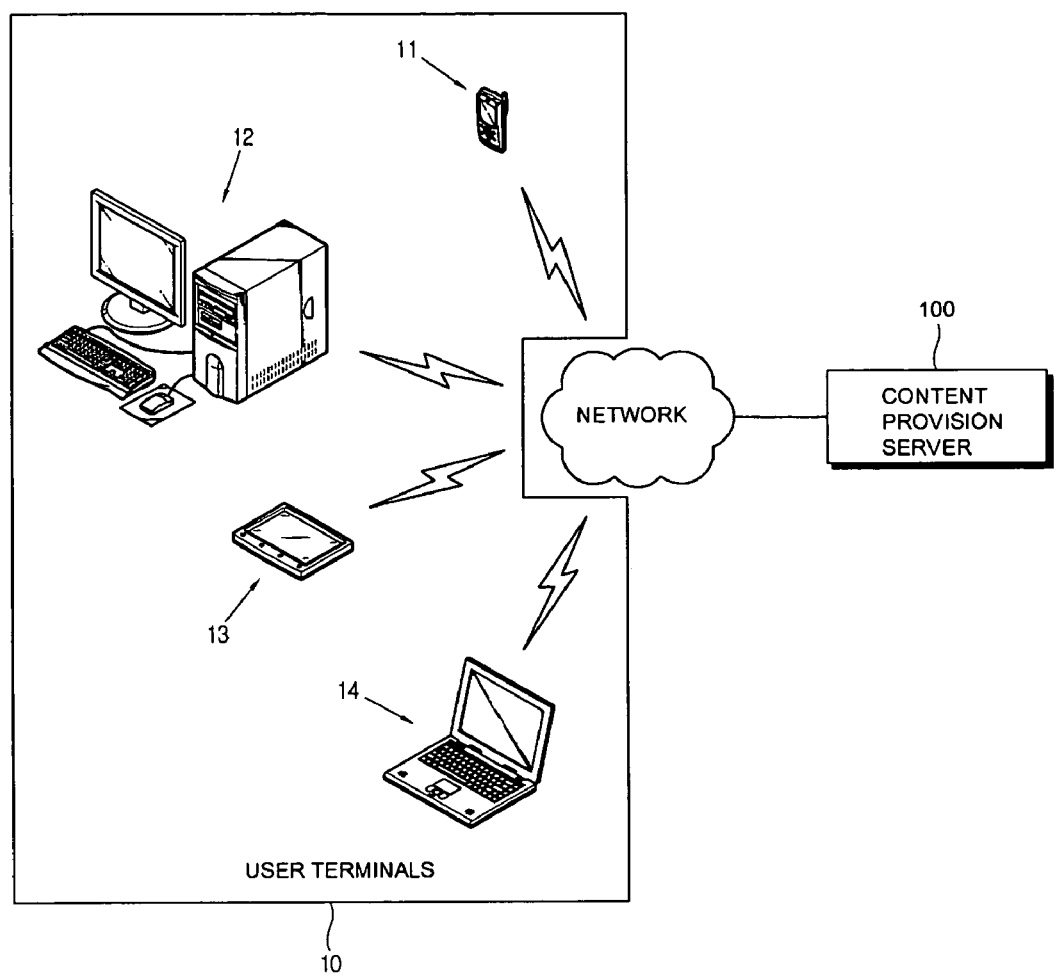
FIG. 1 is a view illustrating the construction of a content provision system according to an embodiment of the present invention.

FIG. 1 is a view illustrating the construction of a content provision system according to an embodiment of the present invention.

As shown in FIG. 1, the content provision system includes a plurality of user terminals 10, such as a mobile phone 11, a desktop computer 12, a portable multimedia player (PMP) 13, and a laptop computer 14, and a content provision server 100.

The user terminals 10, e.g., the mobile phone 11 and the desktop computer 12, output a list of contents provided from the content provision server 100, and allow a user to input contents that the user wishes to play therethrough. The user terminals 10 request the contents that the user wishes to play from the content provision server 100.

The content provision server 100 transmits data for the provision of the contents requested by the user to the user terminals 10 to provide a content service. On the other hand, the content provision server 100 checks the maximum playing time of the contents requested by the user and time for which the contents have been actually played.

That is, when receiving the request of content A, the content provision server 100 checks the maximum playing time of content A and time for which the contents have been played, i.e., time for which the user has listened to or watched content A.

When the user's listening or watching time is equal to the maximum playing time of content A, the content provision server 100 determines that the user has been the most concerned about content A. In this case, the user's concern degree may be expressed to be 1.

On the other hand, when the user has not listened to or watched content A as much as the maximum playing time of content A, the content provision server 100 determines the user's concern degree about content A based on a ratio of the user's listening or watching time to the maximum playing time of content A. In this case, the user's concern degree may be expressed to be not less than 0 and less than 1.

For example, when the maximum playing time of content A is 20 seconds, and the user's listening or watching time is 20 seconds, the user's concern degree may be determined to be 1. On the other hand, when the maximum playing time 20 seconds, and the user's listening or watching time is 10 seconds, the user's concern degree may be determined to be 0.5.

The content provision system according to this embodiment may be applicable to not only playable media, such as audio and video, but also contents, such as flash advertisements and audio advertisements, of an electronic transaction system, e.g., an open market. In this embodiment, it is not necessary for the contents to be limited to general multimedia files.

Figure 2:
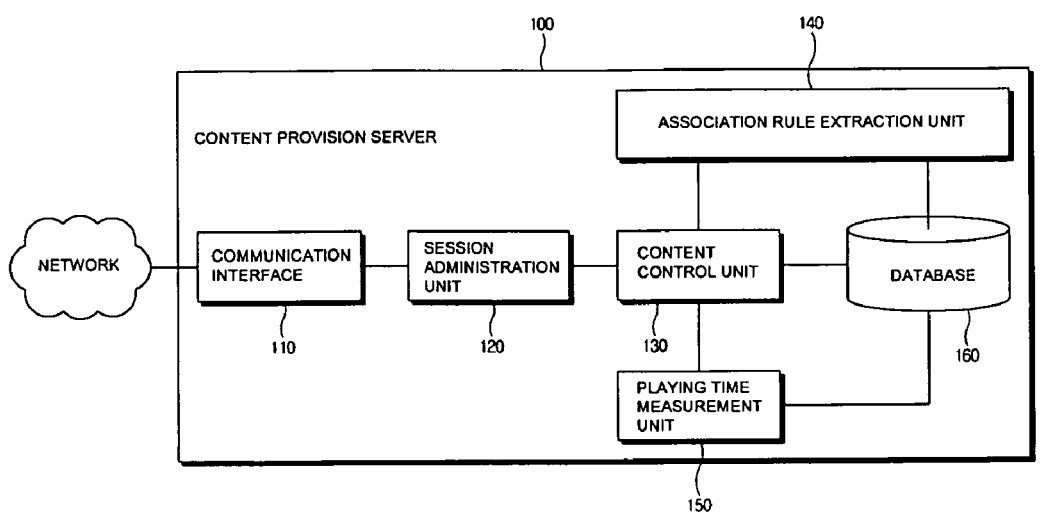
FIG. 2 is a view illustrating the detailed construction of a content provision server of FIG. 1.

FIG. 2 is a view illustrating the detailed construction of the content provision server 100 of FIG. 1.

As shown in FIG. 2, the content provision server 100 includes a communication interface 110, a session administration unit 120, a content control unit 130, an association rule extraction unit 140, a playing time measurement unit 150, and a database 160.

The communication interface 110 is a device that is connected to a network to transmit and receive content-related data and control-related data to and from the user terminals 10 or another external server.

The session administration unit 120 is a component to administrate the sessions of user terminals connected to a server. Particularly, in this embodiment, the session administration unit 120 administrates the sessions between the content provision server 100 and the user terminals 10 requesting contents. A user may request a plurality of contents in a session. The session administration unit 120 administrates sessions for each user. Consequently, it is possible for the content provision server 100 to classify and administrate contents provided for each session and actual playing time of the contents provided for each session.

The content control unit 130 processes requests related to the contents received from the user terminals for which the session establishment has been completed. For example, when the user requests an arbitrary content, the content control unit 130 provides the requested content. Also, when another content is requested to be played during the playing of the content, the content control unit 130 may provide the requested another content.

At this time, when the request to play and end the contents is inputted from the user, the content control unit 130 reports a fact of the content playing and ending to the playing time measurement unit 150. When a second content is requested to be played during the playing of a first content, the content control unit 130 reports the occurrence of an event on the first content ending and the second content playing to the playing time measurement unit 150.

When the content starting and ending event is reported to the playing time measurement unit 150 from the content control unit 130, the playing time measurement unit 150 checks the time when the event was reported to the playing time measurement unit 150. The playing time measurement unit 150 calculates the difference between the ending time and the starting time of each content to obtain the actual playing time of the provided contents.

The calculated playing time of the contents is stored in the database 160 together with identification (ID) of the sessions in which the contents are provided, and ID and the maximum playing time of the contents which are being provided at the present time. Hereinafter, an embodiment of the database 160 to store the above-mentioned information will be described.

The database 160 may include a content table (Table 1) and a playing time table (Table 2).

TABLE 1

| Content table | | |
|---|---|---|
| Content ID | Information of Content | Maximum Playing Time |
| 1 | <content of info. 1> | 30 |
| 2 | <content of info. 2> | 28 |
| 3 | <content of info. 3> | 44 |
| 4 | <content of info. 4> | 36 |
| 5 | <content of info. 5> | 22 |

The content table of Table 1 stores content IDs, information of contents, i.e., information of texts corresponding to the contents, and the maximum playing time of the respective contents. For example, a content having a content ID of 1 has the maximum playing time of 30 seconds, and a content having a content ID of 2 has the maximum playing time of 28 seconds.

It is possible for the content provision server 100 to store and administrate IDs for each content stored and information and the maximum playing time of the respective contents using the content table of Table 1.

TABLE 2

| Playing time table | | |
|---|---|---|
| Session ID | Requested Content ID | Listening & Watching Time |
| 100 | 1 | 27 |
| 100 | 3 | 18 |
| 100 | 2 | 23 |
| 101 | 3 | 26 |
| 101 | 2 | 21 |
| 101 | 4 | 36 |
| 102 | 2 | 24 |
| 102 | 5 | 17 |
| 102 | 3 | 25 |
| 103 | 3 | 28 |
| 103 | 5 | 11 |

The playing time table of Table 2 stores session IDs, requested content IDs, and the actual playing time of the respective contents.

Referring to Table 2, it can be seen that contents having content IDs of 1, 3, and 2 were requested in a session having a session ID of 100, and a user listened to or watched content IDs 1, 3, and 2 for 27 seconds, 18 seconds, and 23 seconds, respectively, in session 100. Also, it can be seen that contents having content IDs of 3, 2, and 4 were provided in a session having a session ID of 101, and the actual playing times of the respective contents were 26 seconds, 21 seconds, and 36 seconds.

Here, the database 160 of the content provision server 100 is not necessarily constructed in the same structure as the above-described tables, such as Table 1 and Table 2. For example, it is possible for the database 160 to administrate necessary information using a structure similar to the above-described tables.

The association rule extraction unit 140 of the content provision server 100 calculates an association degree between the stored contents based on information stored in the tables of Table 1 and Table 2, and determines contents having an association degree equal to or greater than a predetermined reference value to be interoperable contents. The interoperable contents may be stored and administrated in the database 160 in the form of a list.

In particular, the association rule extraction unit 140 applies the actual playing time of the contents to a fuzzy association rule algorithm and obtains values of the association degree (reliance degree) between the contents as a result of the application. It is possible for the association rule extraction unit 140 to obtain a correlation or association relationship in that there is a high probability of content B being played when content A is played, using the association degree values or the reliance degree. A method of extracting an association relationship for each content, which the association rule extraction unit 140 performs using the fuzzy association rule algorithm, will be described in detail hereinafter with reference to FIG. 6.

Meanwhile, the content control unit 130 provides information of contents which a user will be concerned about based on the information of the interoperable contents obtained by the association rule extraction unit 140. For example, when an arbitrary user requests the playing of content A, it is possible for the content control unit 130 to provide the information of content B having a high probability that content B will be played together with content A to the user.

Figure 3:
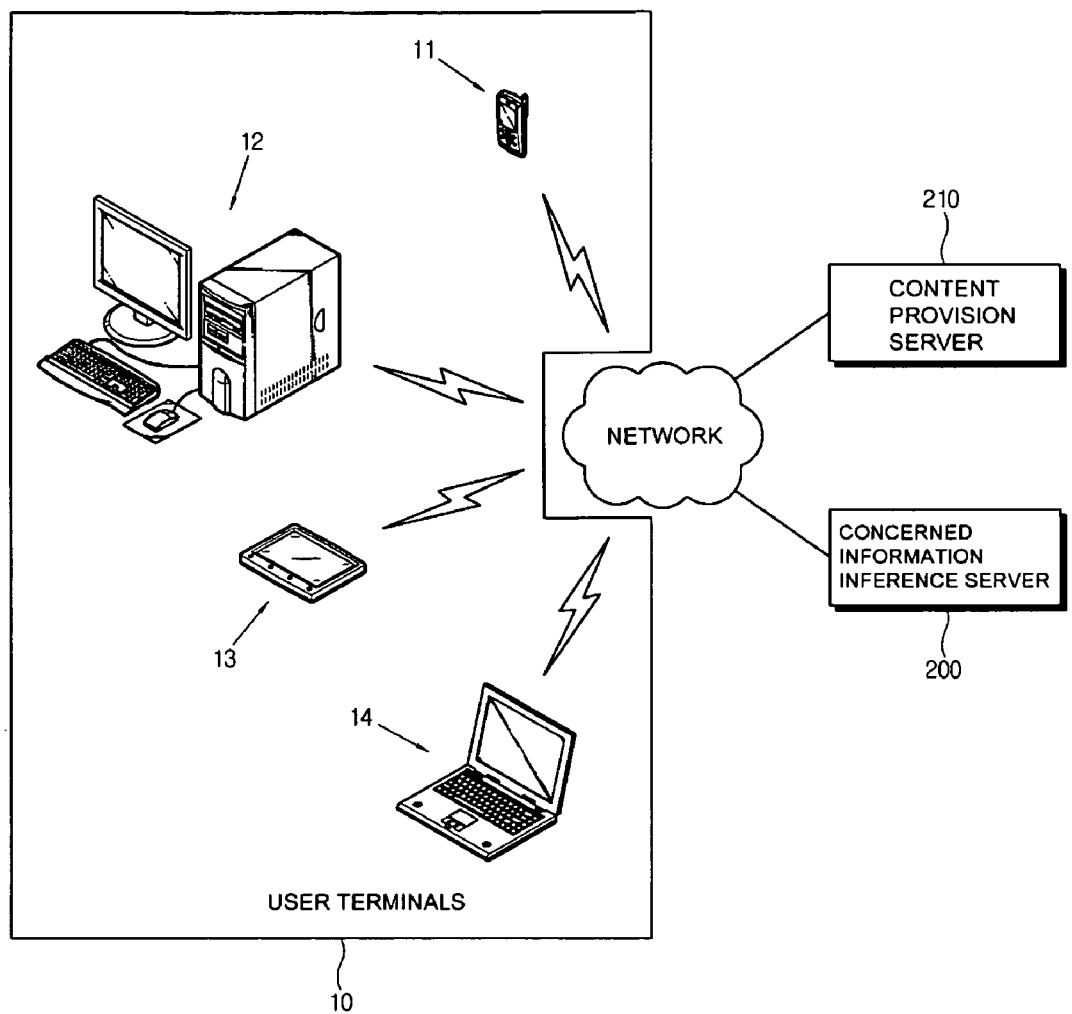
FIG. 3 is a view illustrating the construction of a content provision system according to another embodiment of the present invention.

FIG. 3 is a view illustrating the construction of a content provision system according to another embodiment of the present invention.

The content provision system of FIG. 3 is different in construction from that of FIG. 1 in that a concerned information inference server 200 and a content provision server 210 are separately constructed.

The concerned information inference server 200, separated from the content provision server 210, receives the information of contents provided from the content provision server 210 to the user terminals 10 and the actual playing time of the respective contents.

The concerned information inference server 200 infers information that a user will be concerned about, i.e., user-concerned information, using the information received from the content provision server 210. The inferred information is transmitted to the content provision server 210.

The content provision server 210 provides the information of the associated contents to the user terminals 10 using the user-concerned information received from the concerned information inference server 200.

Figure 4:
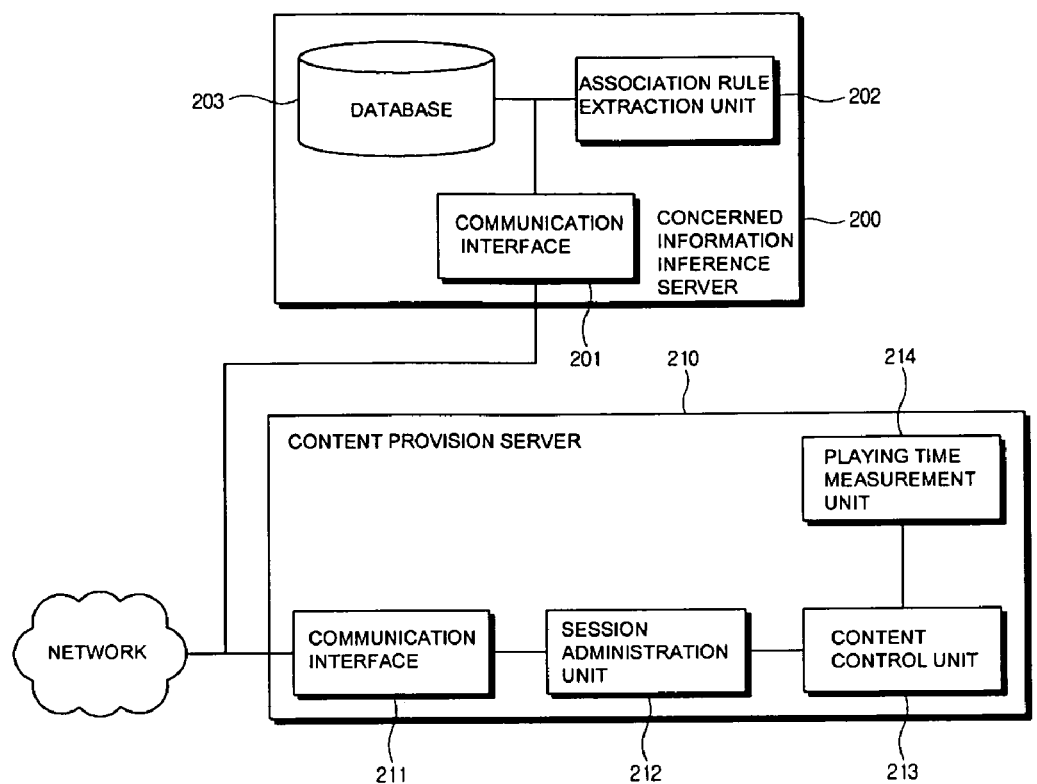
FIG. 4 is a view illustrating the detailed construction of a content provision server and a concerned information inference server of FIG. 3.

FIG. 4 is a view illustrating the detailed construction of the content provision server 210 and the concerned information inference server 200 of FIG. 3.

As shown in FIG. 4, the concerned information inference server 200 includes a communication interface 201, an association rule extraction unit 202, and a database 203. The content provision server 210 includes a communication interface 211, a session administration unit 212, a content control unit 213, and a playing time measurement unit 214.

As previously described, the playing time measurement unit 214 of the content provision server 210 checks user's starting and ending time of the contents, and calculates the playing time of the contents using the checked user's starting and ending time of the contents. The content provision server 210 transmits the information of the contents including the maximum playing time or ID of the contents, the information of the sessions in which the contents are provided, and the playing time information of the contents to the concerned information inference server 200.

The concerned information inference server 200 stores data provided from the content provision server 210 in the database 203. Meanwhile, the association rule extraction unit 202 of the concerned information inference server 200 extracts the association degree or the reliance degree between the contents in consideration of the maximum playing time and the actual playing time of the contents. Also, the association rule extraction unit 202 may decide interoperable contents according to the association degree between the contents and makes a list of the interoperable contents.

The content provision server 210 may receive the list of the interoperable contents from the concerned information inference server 200. Subsequently, when the user terminals 10 request contents included in the list of the interoperable contents, the content provision server 210 provides the information of contents that are interoperable with the requested contents to the user terminals 10.

Figure 5:
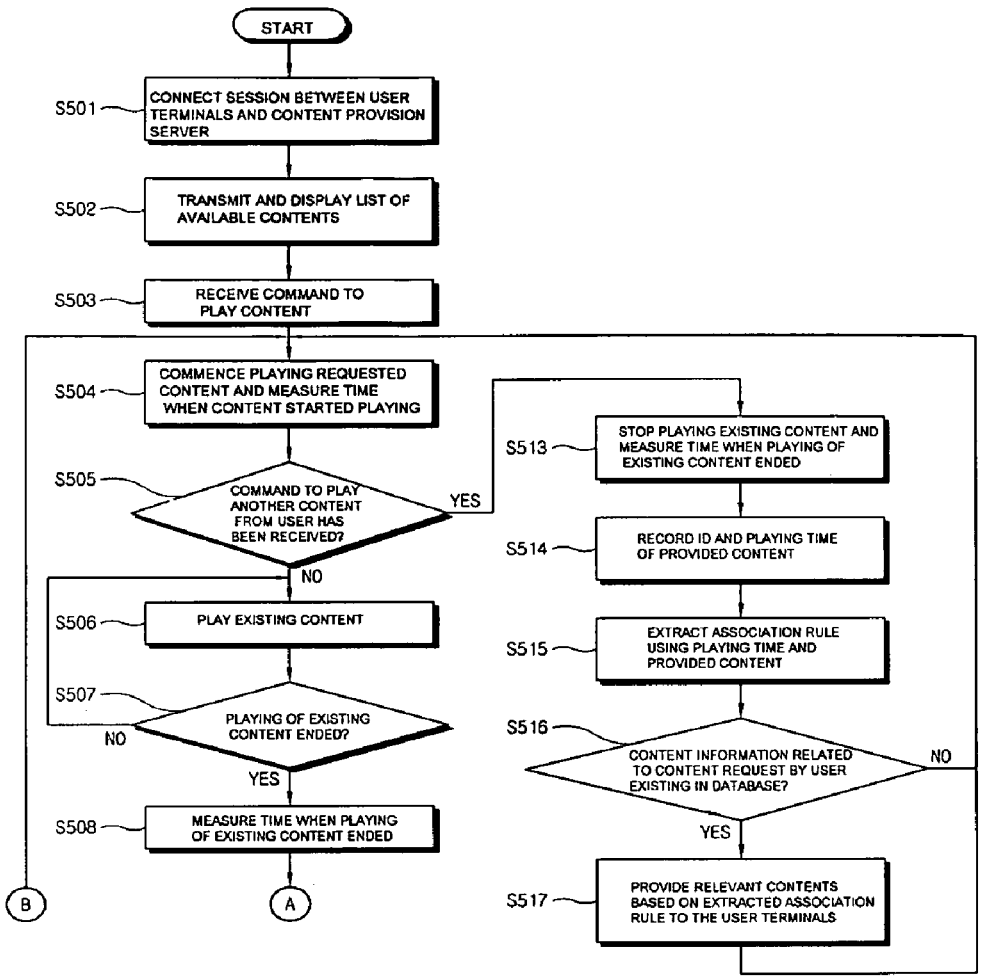
FIG. 5 is a flow chart illustrating a user-concerned information provision method according to a further embodiment of the present invention.
Figure 5:
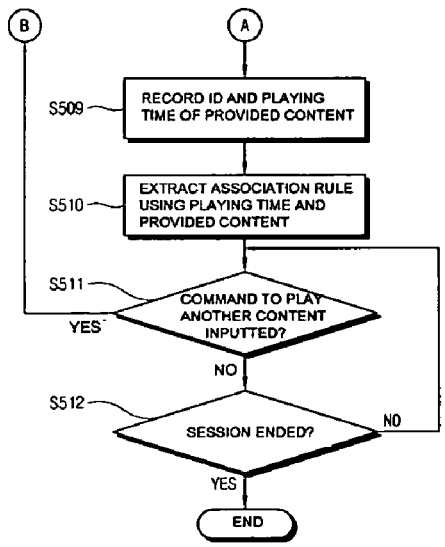

FIG. 5 is a flow chart illustrating a user-concerned information provision method according to a further embodiment of the present invention.

First, the user terminals request contents from the content provision server 210, and, to this end, a session is connected between the user terminals and the content provision server (S501).

After the session connection, the content provision server transmits a list of available contents to the user terminals, and the user terminals display the list of available contents (S502). When a user inputs a command to play one of the displayed contents through the user terminals, the user terminals request the user-specified contents from the content provision server.

When receiving the content provision request from the user terminals (S503), the content provision server commences playing the requested content. At the same time, the content provision server measures the time when the content started playing (S504).

The content provision server determines whether a command to play another content from the user has been received during the playing of the requested content (S505). When determining that the command to play another content from the user has not been received, the content provision server continues to play the existing content (S506).

The content provision server determines whether the playing of the existing content has ended (S507). When determining that the playing of the existing content has ended, the content provision server measures the time when the playing of the existing content ended (S508). Also, the content provision server performs a process of recording the ID and the playing time of the provided content in the database (S509). In this case, of course, the content has been played to the end, and therefore, the playing time of the content recorded in the database is equal to the maximum playing time of the content.

The content provision server extracts an association rule using the information stored in the database, i.e., the maximum playing time and the actual playing time of the contents (S510).

Subsequently, the content provision server determines whether a command to play another content has been inputted through the user terminals (S511). When determining that the command to play another content has been inputted through the user terminals, the procedure returns to Step S504 to process the command to play another content.

When determining that the command to play another content has not been inputted through the user terminals, the content provision server checks periodically whether the session has been ended (S512). When the session between the user terminals and the contents server has been released or ended, the operation to provide the contents and user-concerned information is ended.

On the other hand, when determining at Step S505 that the command to play another content from the user terminals has been received during the playing of the requested content, the content provision server stops playing the existing content, and measures the time when the playing of the existing content ended (S513). Also, the content provision server records the ID and the playing time of the provided content in the database (S514). The content provision server extracts an association rule using the information stored in the database, i.e., the maximum playing time and the actual playing time of the contents (S515).

Subsequently, the content provision server determines whether user-concerned information based on the newly requested content is stored in the database (S516).

When determining at Step S516 that the information on the content requested by the user is stored in the database, the content provision server provides relevant contents based on the extracted association rule, i.e., user-concerned information, to the user terminals (S517). Subsequently, the procedure returns to Step S504 to play the requested content.

Figure 6:
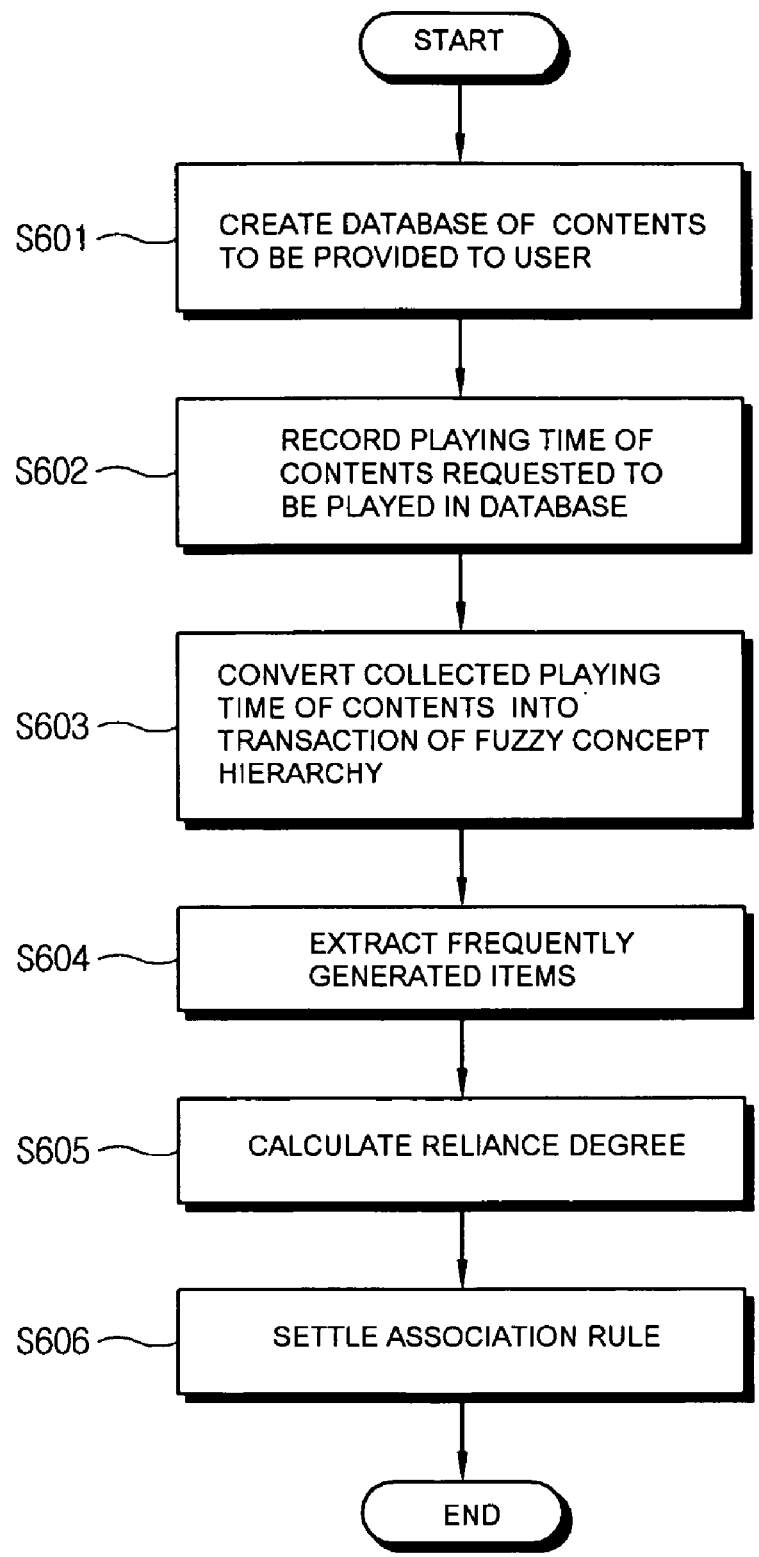
FIG. 6 is a flow chart illustrating an association relationship extraction method using a fuzzy association rule of the present invention.

FIG. 6 is a flow chart illustrating an association relationship extraction method using a fuzzy association rule of the present invention.

First, the content provision server 100 constructs a database to store data of information or contents to be provided to a user (S601). The content provision server 100 may use various database tables. However, it is more preferable for the content provision server 100 to use relational database tables, such as Table 1 and Table 2, to effectively administrate the contents and the playing time of the contents.

The inherent ID of the contents (content ID), the text to be broadcasted to a user (text of content), and the maximum playing time of each piece of information may be automatically recorded in the database when the details of the contents to be provided to a user are inputted into the database by a system administrator.

In particular, the maximum playing time of audio contents may be inputted according to the performance and properties of text to speech (TTS), and it is more preferable to configure the maximum playing time of video contents such that the maximum playing type of video contents can be automatically inputted according to the information of content files concerned.

Also, the content provision server 100 collects a list of contents requested by users and listening or watching time of the contents (S602).

The content provision server 100 records the list of contents requested by the users assessing the content provision server and the playing time of the contents in the relational database table configured as in Table 2 described above. The database table of Table 2 includes session IDs, requested content IDs, and user's listening or watching time of the requested contents.

The user's listening or watching time cannot exceed the maximum playing time of the information concerned. The collected information is used as transaction for data mining.

The content provision server converts the collected information into a transaction of a fuzzy concept hierarchy (S603). When considering the listening or watching time of the respective contents, it is not possible to use a general association rule inquiry algorithm (for example, apriori, ft-tree, etc.) In this embodiment, a method of applying a fuzzy association relationship algorithm is proposed. To this end, the table of Table 2 is converted into a transaction of a fuzzy concept hierarchy. A membership function is used for conversion into the fuzzy concept hierarchy.

FIGS. 7A to 7E are graphs illustrating examples of a membership function for conversion into a fuzzy concept hierarchy.

In FIGS. 7A to 7E, an x-axis of the membership function indicates playing time, and an y-axis of the membership function indicates a fuzzy value to be converted. The maximum value of the x-axis is the maximum playing time of contents concerned. The membership function, made by equally dividing the maximum playing time of contents at a predetermine ratio (dividing the maximum playing time of contents into five equal parts in this embodiment), is used to convert the actual playing time of contents requested by a user into a fuzzy value or transaction meaning how long the user has listened to or watched the contents.

Figure 7A:
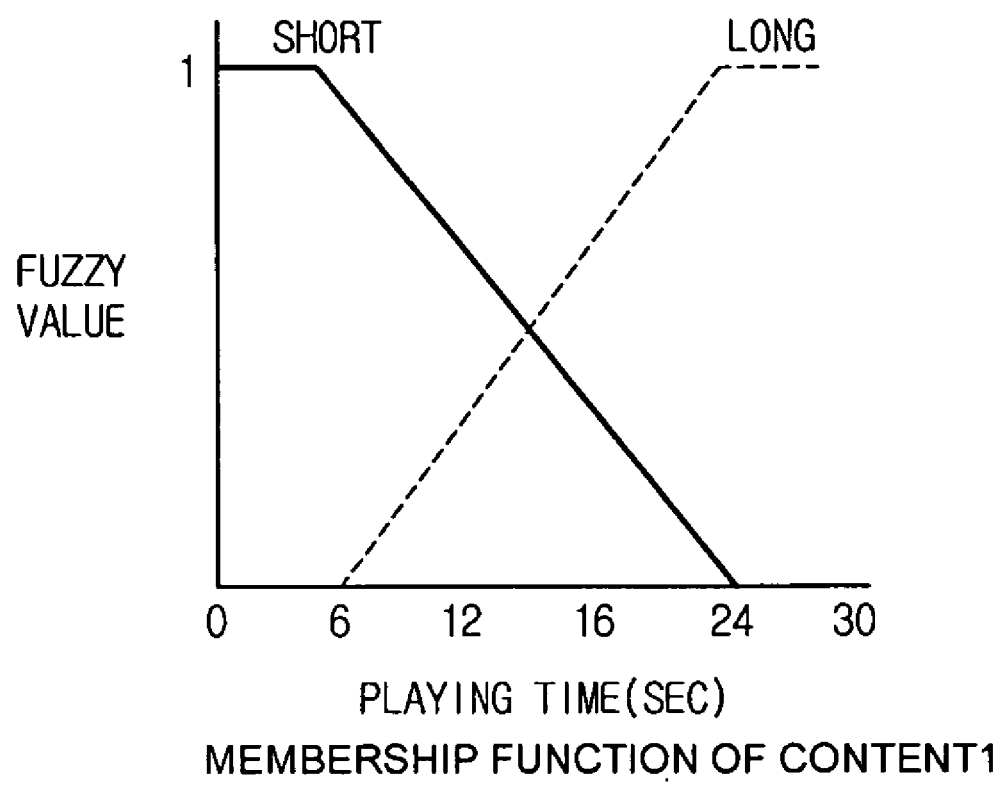
FIGS. 7A to 7E are graphs illustrating examples of a membership function for conversion into a fuzzy concept hierarchy.
Figure 7B:
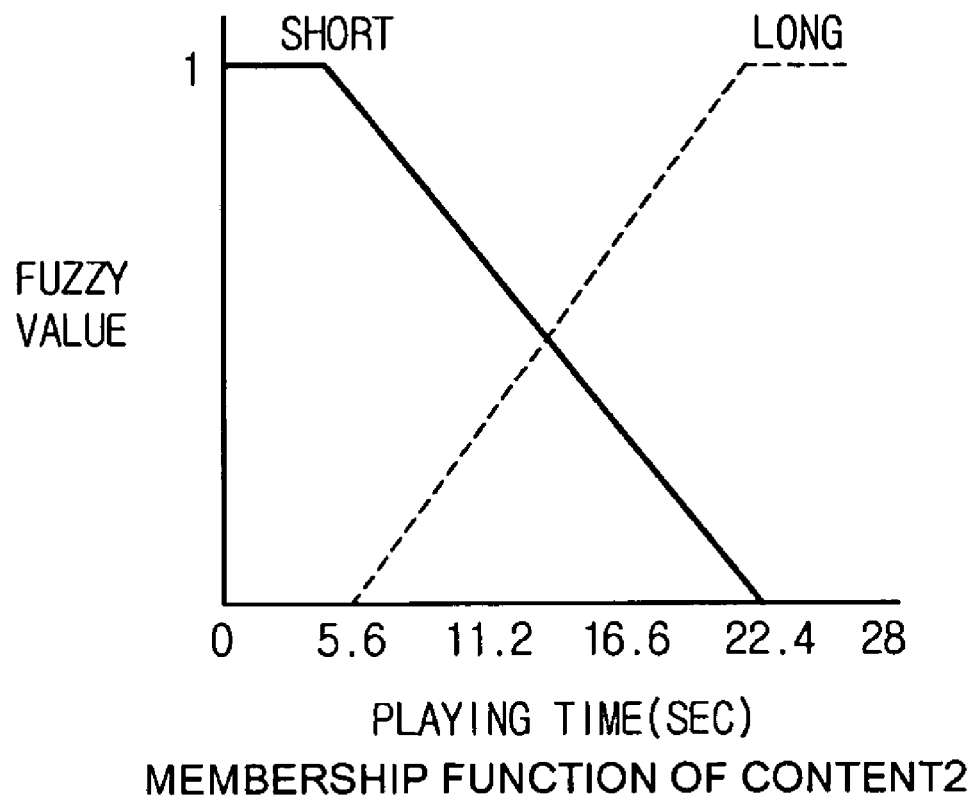

According to Table 2, content No. 1 having a maximum playing time of 30 seconds was listened to for 27 seconds in session ID 100. This corresponds to a case in which the fifth section x of the maximum playing time of the content concerned exceeds 24. That is, according to FIG. 7A illustrating a membership function of content No. 1, a listening degree corresponding to 'Long' is 1, and a listening degree corresponding to 'Short' is 0.

Also, information No. 3 having a maximum playing time of 44 seconds was listened to for 18 seconds in session ID 100. Membership functions, i.e., equations of FIG. 7C, may be used to determine how long a user has listened to the information. The equations of FIG. 7C are indicated in the following tables.

TABLE 3

Figure 7C:
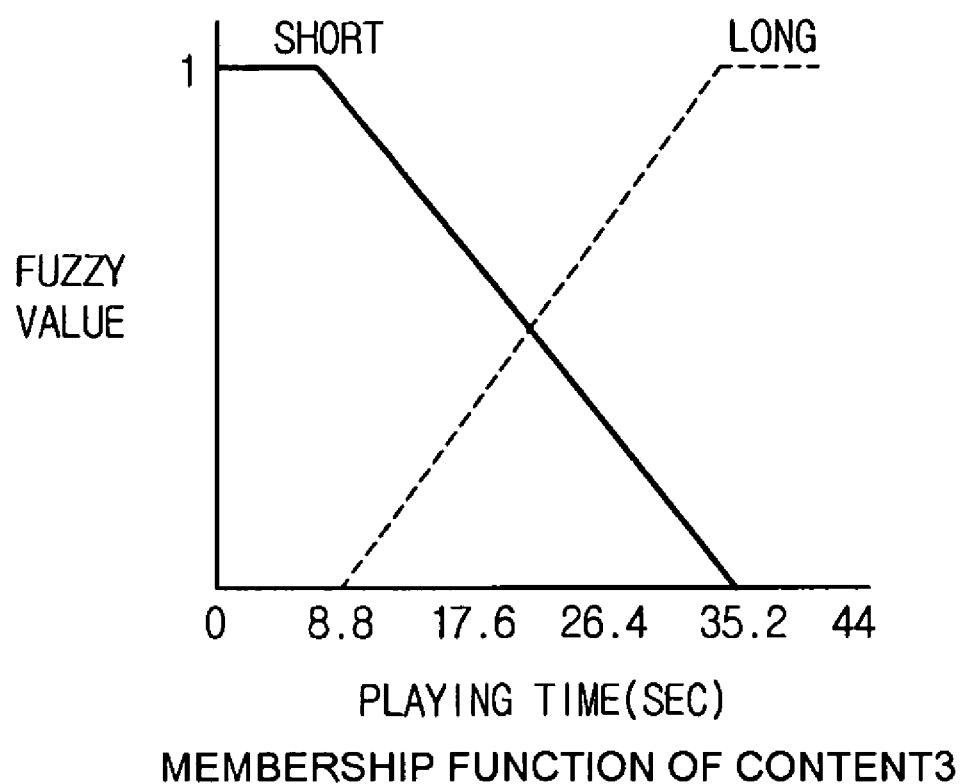
Figure 7D:
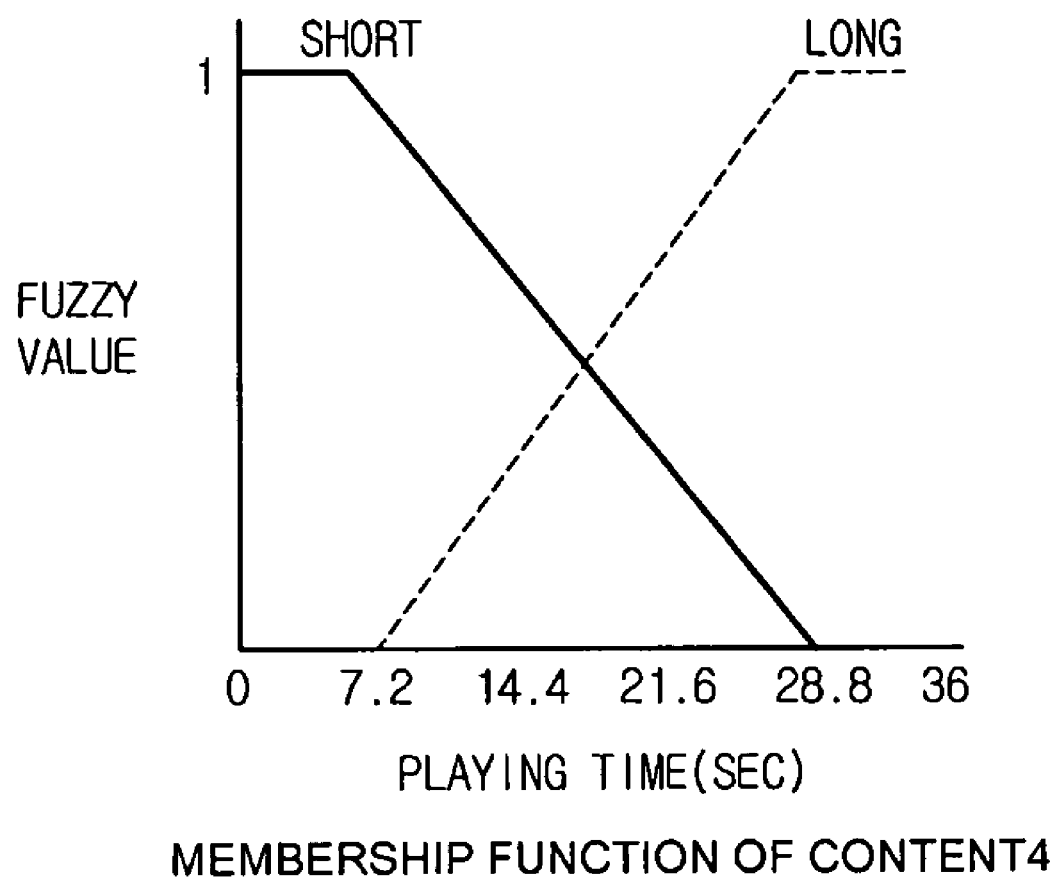
Figure 7E:
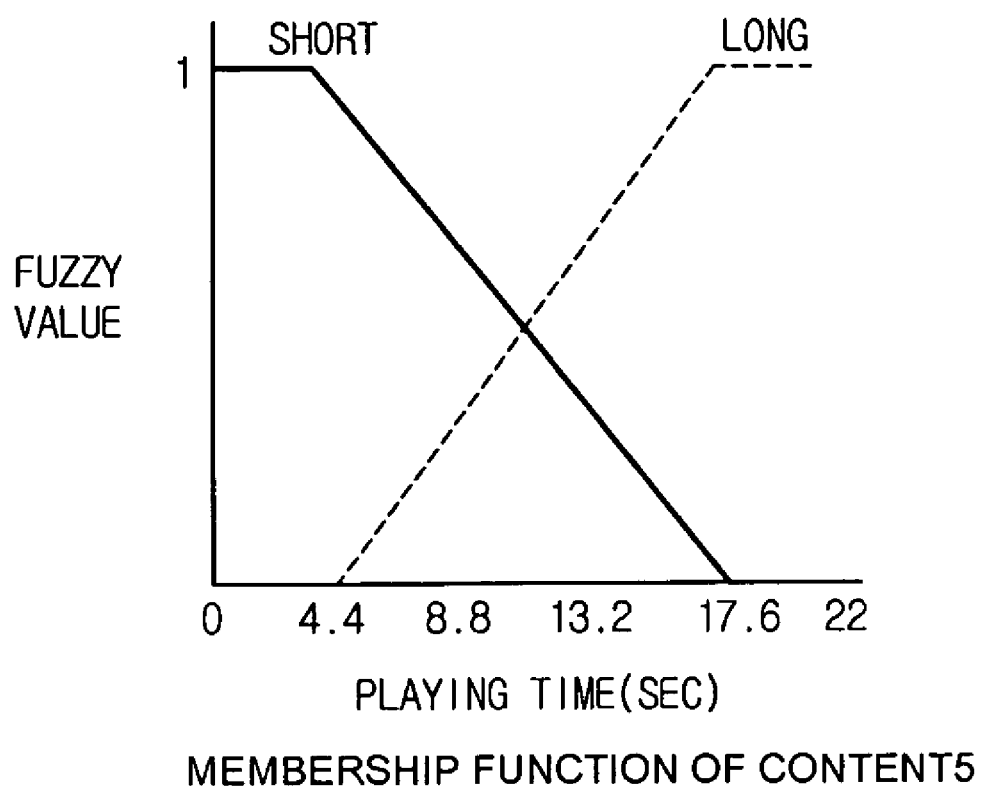

'Short' membership function equation of FIG. 7C
Equation of 'Short'

| | |
|---|---|
| $y = 1$ | $0 < x < 8.8$ |
| $y = -1/26.4x + 4/3$ | $8.8 <= x <= 35.2$ |
| $y = 0$ | $35.2 < x <= 44$ |

TABLE 4

'Long' membership function equation of FIG. 7C
Equation of 'Long'

| | |
|---|---|
| $y = 0$ | $0 < x < 8.8$ |
| $y = 1/26.4x - 1/3$ | $8.8 <= x <= 35.2$ |
| $y = 1$ | $35.2 < x <= 44$ |

Consequently, when the user listened to content No. 3 for 18 seconds, a listening degree corresponding to 'Short' is 0.651, and a listening degree corresponding to 'Long' is 0.348. According to a fuzzy algorithm, the sum of the two listening degrees theoretically must be 1; however, the sum of the two listening degrees actually does not become 1. For this reason, it is preferable to take the result of 1–'Short' as 'Long' or the result of 1–'Long' as 'Short'.

In this embodiment, the former method is chosen. Consequently, a listening degree corresponding to 'Short' is calculated to be 0.651, and a listening degree corresponding to 'Long' is calculated to be 0.349.

Tables 3 and 4 propose membership function equations of the graph of FIG. 7C. Membership function equations of other graphs of FIGS. 7B, 7D, and 7E may be derived in manners similar to the above-described membership function equations, and therefore, a detailed description thereof will not be given.

Figure 8A:
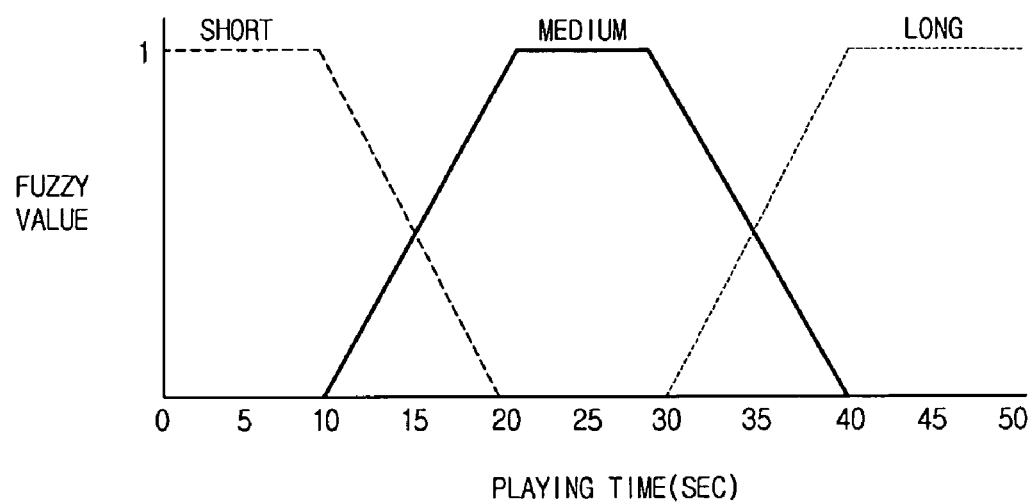
FIGS. 8A and 8B are graphs illustrating other examples of a membership function for conversion into a fuzzy concept hierarchy.
Figure 8B:
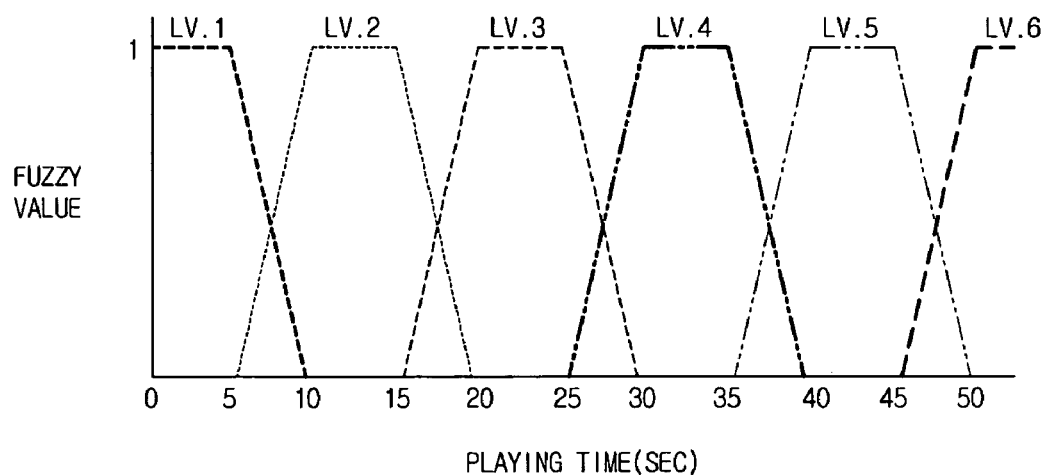

FIGS. 8A and 8B are graphs illustrating other examples of a membership function for conversion into a fuzzy concept hierarchy.

In the graphs of FIGS. 7A to 7E, the function of the fuzzy value to the playing time of the contents, i.e., the membership function, is classified into 'Short' and 'Long'. The 'Short' membership function means how short the contents have been played, and the 'Long' membership function means how long the contents have been played.

Similarly, FIG. 8A illustrates that the membership function is classified into 'Short', 'Medium', and 'Long'. Also, FIG. 8B illustrates that the membership function is classified into Level 1 to Level 6.

As can be seen from FIGS. 8A and 8B, the membership function may be configured in various forms. In this embodiment, the content provision server may choose one or more of the various membership functions to obtain a fuzzy value.

The content provision server may obtain a transaction of a fuzzy concept hierarchy as indicated in Table 5 below using the membership function as previously described with reference to FIGS. 7A to 7E and Tables 3 and 4.

TABLE 5

Table of transaction of fuzzy concept hierarchy

| Session ID | Information 1 | | Information 2 | | Information 3 | | Information 4 | | Information 5 | |
|---|---|---|---|---|---|---|---|---|---|---|
| | Short | Long | Short | Long | Short | Long | Short | Long | Short | Long |
| 100 | 0 | 1 | 0 | 1 | 0.651 | 0.349 | — | — | — | — |
| 101 | — | — | 0.083 | 0.917 | 0.348 | 0.652 | 0 | 1 | — | — |
| 102 | — | — | 0 | 1 | 0.386 | 0.614 | — | — | 0.045 | 0.955 |
| 103 | — | — | — | — | 0.272 | 0.728 | — | — | 0.5 | 0.5 |

The content provision server extracts items frequently generated during the transaction of the fuzzy concept hierarchy (S604).

To extract the frequently generated items, the content provision server uses a support value that can be calculated using fuzzy values corresponding to the respective items of Table 5 and the following mathematical expression.

$$supp(item) = \frac{\sum_i \mu_{item}(t_i)}{D}$$ [Mathematical expression 1]

Where, supp(item) is a support degree of item contents, $\mu_{item}(t_i)$ is an $i^{th}$ transaction value or fuzzy value of the item contents, and D is the number of transactions, not 0. A process of applying the fuzzy value of FIG. 5 to Mathematical expression 1 and the result thereof are indicated in the following table.

TABLE 6

Table of support degree

| Item | Calculation process | Support degree |
|---|---|---|
| 1 Short | 0/1 | 0 |
| 1 Long | 1/1 | 1 |
| 2 Short | (0 + 0 + 0.083)/3 | 0.027 |
| 2 Long | (1 + 0.917 + 1)/3 | 0.972 |

TABLE 6-continued

Table of support degree

| Item | Calculation process | Support degree |
|---|---|---|
| 3 Short | (0.651 + 0.348 + 0.386 + 0.272)/4 | 0.414 |
| 3 Long | (0.349 + 0.652 + 0.614 + 0.728)/4 | 0.585 |
| 4 Short | 0/1 | 0 |
| 4 Long | 1/1 | 1 |
| 5 Short | (0.045 + 0.5)/2 | 0.272 |
| 5 Long | (0.955 + 0.5)/2 | 0.727 |

Subsequently, the content provision server determines that items satisfying the critical value or more of the minimum support degree that can be decided by the system administrator are the frequently generated items.

For example, when the critical value of the minimum support degree is decided to be 0.4, the content provision server determines that '2 Long', '3 Short', '3 Long', and '5 Long', among the items of Table 6, are the frequently generated items.

A general data mining technology only considers the number of generation times, whereas mining performed in a fuzzy concept hierarchy may consider the quantity. In this embodiment, user's listening or watching time is considered. It is possible for this method to recommend more reliable concerned information to a user using a property in which a user having listened to a specific piece of information for a long time is concerned about the information concerned.

The content provision server calculates an association degree between the frequently generated items (S605).

As previously described, '2 Long', '3 Short', '3 Long', and '5 Long', extracted at Step S604, are items that have frequently appeared. The items that have frequently appeared are combined with one another to create rule candidates having a possibility of continuous generation. For example, R: 2 Long 3 Short, and R: 2 Long 3 Long. In this embodiment, 'R: 2 Long 3 Long' is a rule candidate meaning that users having listened to or watched information No. 2 for a long time also have listened to or watched information No. 3 for a long time.

After creating one or more rule candidates, the content provision server calculates an association degree between the rule candidates. The calculation of the association degree may be performed by Mathematical expressions 2 and 3 below.

$$conf(item1 \rightarrow item2) = \frac{supp(item1, item2)}{supp(item1)}$$ [Mathematical expression 2]

-continued $$supp(item_1, item_2) = \frac{\sum_i \min(\mu_{item1}(t_i), \mu_{item2}(t_i))}{D}$$ [Mathematical expression 3]

Where, conf(item1→item2) is a value of an association degree of the rule candidate linked from item No. 1 (item1) to item No. 2 (item2). Also, supp(item1, item2) is a support degree between the item No. 1 content and the item No. 2 content. $\mu_{item1(t1)}$ and $\mu_{item2}(t_i)$ are $i^{th}$ transaction values of the item No. 1 and item No. 2 contents, and D is the number of transactions of item No. 1 and item No. 2, not 0.

In this embodiment, however, when calculating the association degree, only the transactions having two items simultaneously generated are chosen from the total transactions to calculate the value of the support degree.

For example, in the table of Table 6, the support degree of an item '3 Short' is calculated to be (0.651+0.348+0.386+ 0.272)/4=0.414.

However, when Mathematical expressions 2 and 3 are applied to calculate the rule '3 Short 2 Long', only the transactions having values existing in both '3 Short' and '2 Long' are chosen to calculate the value of the support degree. Consequently, when applying Mathematical expression 2, the support degree of '3 Short' to be located in a denominator is calculated to be (0.651+0.348+0.386)/3=0.462.

A process of calculating values of association degrees for respective rule candidates that can be obtained from Table 6 and Mathematical expressions 2 and 3 and the result thereof are indicated in the following table.

TABLE 7

| No | Rule candidate | Calculation process | Reliance degree |
|---|---|---|---|
| 1 | 2 Long → 3 Short | {(0.651 + 0.348 + 0.386)/3}/ {(1 + 0.917 + 1)/3} | 0.474 |
| 2 | 2 Long → 3 Long | {(0.349 + 0.652 + 0.614)/3}/ {(1 + 0.917 + 1)/3} | 0.553 |
| 3 | 2 Long → 5 Long | 0.955/1 | 0.995 |
| 4 | 3 Short → 2 Long | {(0.651 + 0.348 + 0.386)/3}/ {(0.651 + 0.348 + 0.386)/3} | 1 |
| 5 | 3 Short → 5 Long | {(0.386 + 0.272)/2}/{(0.386 + 0.272)/2} | 1 |
| 6 | 3 Long → 2 Long | {(0.349 + 0.652 + 0.614)/3}/ {(0.349 + 0.652 + 0.614/3)} | 1 |
| 7 | 3 Long → 5 Long | {(0.386 + 0.272)/2}/{(0.386 + 0.272)/2} | 1 |
| 8 | 5 Long → 2 Long | 0.955/0.955 | 1 |
| 9 | 5 Long → 3 Long | {(0.614 + 0.512)/2}/{(0.955 + 0.5)/2} | 0.766 |

The content provision server settles an association rule using the calculation result of the reliance degree (S606).

For example, it is possible to remove a rule including an item in which Y is 'Short' in 'R: X→Y' from the inquiry result of the association rule. That is, rule No. 1 may be removed from Table 7.

Also, the content provision server settles rules having the critical value or more of the minimum association degree that has been previously decided by the system administrator, among the remaining rules, as the final association rules. On the assumption that the critical value of the minimum association degree is 0.7, rule Nos. 3, 4, 5, 6, 7, and 8 may be decided as the association rules as illustrated in FIG. 8A and 8B.

In a condition in which the association rules are settled as described above, when a user has listened to content No. 3 for a long time, the content provision server recommends content No. 2 and No. 5 to the user.

The association rule settled as described above may be stored in the database of the content provision server. Afterwards, when the user requests a content, the content provision server provides contents associated with the requested content as user-concerned information to the user.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

As apparent from the above description, the user-concerned information recommendation system and method considering playing time of contents according to the present invention is capable of measuring the user's concern degree using the actual playing time of a content requested by a user and the maximum playing time of the requested content. Consequently, the present invention has the effect of discovering a more accurate association rule, whereby it is possible to provide information which the user may be concerned about.

What is claimed is:

1. A user-concerned information provision system comprising:
    a plurality of user terminals to provide contents transmitted from an external server to a user;
    a user-concerned information inference server to infer an association relationship between the contents based on information of maximum playing time and actual playing time of the contents provided to the user terminals; and
    a content provision server to provide a content requested by an arbitrary one of the user terminals and other contents associated with the requested content according to the inferred association relationship to the arbitrary one of the user terminals when receiving a request of the content from the arbitrary one of the user terminals,
    wherein the user-concerned information inference server applies the maximum playing time and the actual playing time of the contents to a fuzzy association rule inquiry algorithm to infer the association relationship between the contents, and
    wherein the user-concerned information inference server applies the information of the maximum playing time and the actual playing time of the contents to a membership function to find a transaction, calculates a support degree according to a transaction for each content using the found transaction, extracts a candidate content pair having a support degree equal to or greater than a predetermined reference value to calculate an association degree between the candidate contents, and, when the association degree is equal to or greater than a predetermined reference association degree, determines the candidate content pair to be interoperable contents.

2. The user-concerned information provision system according to claim 1, wherein the user-concerned information inference server comprises a database to store information of maximum playing time of stored contents and actual playing time of the contents provided for each session.

3. The user-concerned information provision system according to claim 1, wherein the support degree is calculated using a mathematical expression below:

$$supp(item) = \frac{\sum_i \mu_{item}(t_i)}{D}$$

where, supp(item) is a support degree of item contents, $\mu_{item}(t_i)$ is an $i^{th}$ transaction of the item contents, and D is the number of transactions, not 0.

4. The user-concerned information provision system according to claim 3, wherein the association degree between the candidate contents is calculated using mathematical expressions below:

$$conf(item1 \rightarrow item2) = \frac{supp(item1, item2)}{supp(item1)}$$

$$supp(item_1, item_2) = \frac{\sum_i \min(\mu_{item1}(t_i), \mu_{item2}(t_i))}{D}$$

where, conf(item1→item2) is an association degree from item No. 1 content (item1) to item No. 2 content (item2),
supp(item1, item2) is a support degree between the item No. 1 content and the item No. 2 content,
$\mu_{item1}(t_i)$ and $\mu_{item2}(t_i)$ are $i^{th}$ transaction values of the item No. 1 and item No. 2 contents, and
D is the number of transactions of item No. 1 and item No. 2, not 0.

5. The user-concerned information provision system according to claim 1, wherein the membership function is a function between the actual playing time of the contents and the transaction.

6. The user-concerned information provision system according to claim 1, wherein the transaction is classified into a short transaction meaning how short the contents have been played and a long transaction meaning how long the contents have been played.

7. A user-concerned information provision method comprising:
providing a plurality of requested contents to user terminals and measuring time for which the respective contents have been actually played by the user terminals;
inferring an association relationship between the contents using maximum playing time and the actual playing time of the contents provided to the user terminals; and
providing a content requested to be played by an arbitrary one of the user terminals and other contents associated with the requested content according to the inferred association relationship to the arbitrary one of the user terminals when receiving a request to play the content from the arbitrary one of the user terminals,
wherein the step of inferring the association relationship between the contents comprises:
storing actual playing time of the contents provided for each session;
applying the maximum playing time and the actual playing time of the contents to a membership function to operate a transaction;
calculating a support degree according to a transaction for each content and deciding a candidate content pair having a support degree equal to or greater than a predetermined reference value; and
calculating an association degree between the candidate contents of the candidate content pair and, when the association degree is equal to or greater than a predetermined reference association degree, determining the candidate content pair to be interoperable contents.

8. The user-concerned information provision method according to claim 7, wherein the step of inferring the association relationship between the contents comprises applying the maximum playing time and the actual playing time of the contents to a fuzzy association rule inquiry algorithm to infer the association relationship between the contents.

9. The user-concerned information provision method according to claim 7, wherein the membership function is a function between the actual playing time of the contents and the transaction.

10. The user-concerned information provision method according to claim 7, wherein the transaction is classified into a short transaction meaning how short the contents have been played and a long transaction meaning how long the contents have been played.

11. The user-concerned information provision method according to claim 7, wherein the step of calculating the support degree is carried out using a mathematical expression below:

$$supp(item) = \frac{\sum_i \mu_{item}(t_i)}{D}$$

where, supp(item) is a support degree of item contents, $\mu_{item}(t_i)$ is an $i^{th}$ transaction of the item contents, and D is the number of transactions, not 0.

12. The user-concerned information provision method according to claim 7, wherein the step of calculating the association degree between the two candidate contents is carried out using mathematical expressions below:

$$conf(item1 \rightarrow item2) = \frac{supp(item1, item2)}{supp(item1)}$$

$$supp(item_1, item_2) = \frac{\sum_i \min(\mu_{item1}(t_i), \mu_{item2}(t_i))}{D}$$

where, conf(item1→item2) is an association degree from item No. 1 content (item1) to item No. 2 content (item2),
supp(item1, item2) is a support degree between the item No. 1 content and the item No. 2 content,
$\mu_{item1}(t_i)$ and $\mu_{item2}(t_i)$ are $i^{th}$ transaction values of the item No. 1 and item No. 2 contents, and
D is the number of transactions of item No. 1 and item No. 2, not 0.

13. A content provision server comprising:
a playing time measurement unit to measure time for which a plurality of contents provided to user terminals have been actually played;
a database to store maximum playing time and the actual playing time of the contents;
an association rule extraction unit to extract an association relationship between the contents; and
a content control unit to provide information of a content requested by an arbitrary one of the user terminals and other contents associated with the requested content according to the inferred association relationship to the arbitrary one of the user terminals when receiving a request of the content from the arbitrary one of the user terminals, wherein the association rule extraction unit applies the information of the maximum playing time and the actual playing time of the contents to a membership function to find a transaction, calculates a support degree according to a transaction for each content using the found transaction, extracts a candidate content pair having a support decree equal to or greater than a predetermined reference value to calculate an association degree between the candidate contents, and, when the association degree is equal to or greater than a predetermined reference association degree, determines the candidate content pair to be interoperable contents.

14. The content provision server according to claim 13, wherein the association rule extraction unit applies the actual playing time of the contents to a fuzzy association rule inquiry algorithm to infer the association relationship between the contents.

15. The content provision server according to claim 13, wherein the membership function is a function between the actual playing time of the contents and the transaction.

16. The content provision server according to claim 13, wherein the transaction is classified into a short transaction meaning how short the contents have been played and a long transaction meaning how long the contents have been played.

17. The content provision server according to claim 13, wherein the association rule extraction unit calculates the support degree using a mathematical expression below:

$$supp(item) = \frac{\sum_i \mu_{item}(t_i)}{D}$$

where, supp(item) is a support degree of item contents, $\mu_{item}(t_i)$ is an $i^{th}$ transaction of the item contents, and D is the number of transactions, not 0.

18. The content provision server according to claim 13, wherein the association rule extraction unit calculates the association degree between the two candidate contents using mathematical expressions below:

$$conf(\text{item1} \rightarrow \text{item2}) = \frac{supp(\text{item1, item2})}{supp(\text{item1})}$$

$$supp(item_1, item_2) = \frac{\sum_i \min(\mu_{item1}(t_i), \mu_{item2}(t_i))}{D}$$

where, conf(item1→item2) is an association degree from item No. 1 content (item1) to item No. 2 content (item2), supp(item1, item2) is a support degree between the item No. 1 content and the item No. 2 content, $\mu_{item1}(t_i)$ and $\mu_{item2}(t_i)$ are $i^{th}$ transaction values of the item No. 1 and item No. 2 contents, and
D is the number of transactions of item No. 1 and item No. 2, not 0.

19. A user-concerned information inference method comprising:
storing maximum playing time of a plurality of contents and actual playing time of the contents in a database;
calculating an association degree between the contents using the maximum playing time and the actual playing time of the contents stored in the database; and
inferring concerned information of a user having selected an arbitrary one of the contents using the calculated association degree,
wherein the step of calculating the association degree between the contents comprises:
applying the maximum playing time and the actual playing time of the contents to a membership function to operate a transaction value;
calculating a support degree to play the contents using the operated transaction value; and
extracting a candidate content pair, which can be associated with each other, having a support degree equal to or greater than a predetermined reference value and calculating an association decree between the candidate contents using the transaction value of the candidate contents.

20. The user-concerned information inference method according to claim 19, wherein the step of calculating the support degree of the contents using the transaction value is carried out using a mathematical expression below:

$$supp(item) = \frac{\sum_i \mu_{item}(t_i)}{D}$$

where, supp(item) is a support degree of item contents, $\mu_{item}(t_i)$ is an $i^{th}$ transaction of the item contents, and D is the number of transactions, not 0.

21. The user-concerned information inference method according to claim 20, wherein the step of calculating the association degree between the two candidate contents is carried out using mathematical expressions below:

$$conf(\text{item1} \rightarrow \text{item2}) = \frac{supp(\text{item1, item2})}{supp(\text{item1})}$$

$$supp(item_1, item_2) = \frac{\sum_i \min(\mu_{item1}(t_i), \mu_{item2}(t_i))}{D}$$

where, conf(item1→item2) is an association degree from item No. 1 content (item1) to item No. 2 content (item2), supp(item1, item2) is a support degree between the item No. 1 content and the item No. 2 content, $\mu_{item1}(t_i)$ and $\mu_{item2}(t_i)$ are $i^{th}$ transaction values of the item No. 1 and item No. 2 contents, and
D is the number of transactions of item No. 1 and item No. 2, not 0.

* * * * *